二,989,408
Patented June 20, 1961

2,989,408
METHOD AND MIX COMPOSITION FOR PRODUCING OXIDATION RESISTANT CARBON ARTICLES
Charles S. Lowe, Niagara Falls, N.Y., and John D. Nickerson, Lakeland, Fla., assignors to Union Carbide Corporation, a corporation of New York
No Drawing. Filed Oct. 24, 1958, Ser. No. 769,296
5 Claims. (Cl. 106—56)

This invention refers to oxidation resistant carbon articles and more particularly refers to a method and mix composition for producing the same.

Refractory articles composed of carbon, such as for example, furnace lining brick, are made conventionally by mixing comminuted particles of carbon and a carbonizable binder therefor, molding the mixture to a desired shape and then baking the shape to a carbonizing temperature. Similarly, furnace electrodes are made in much the same manner. When articles of this nature are employed in furnaces in the presence of an oxidizing atmosphere, a continuous oxidation of the carbon takes place. The brick is usually oxidized from the interior of the furnace to the furnace wall and the electrodes are generally oxidized from the interior surface to the center thereof.

In the prior art various expedients have been employed for applying protective films to carbon articles to protect them against oxidation. Among these are the employment of phosphoric acid, boro-phosphoric acid and inorganic phosphate salts. The listed materials are generally introduced into the pores of a formed carbon body by impregnating it with the acid itself, or with a solution of a phosphate salt dissolved in phosphoric acid. For impregnating a formed body, an aqueous solution of certain phosphates may be used or impregnation may be attained by alternately impregnating with a solution of a metallic halide and phosphoric acid. When impregnating with a solution such as one of phosphoric acid, the protection thus afforded to the treated carbon is limited by the amount of acid that can be absorbed, and by its volatilizing temperature. Phosphates may also be provided in a carbon body by the direct addition of phosphate salts to the mix from which it is formed.

Phosphorus-containing organic compounds have been used in the past by various workers in this general field of carbon article technology to provide a plasticizing effect on the carbon material from which they are formed. This enables forming of such material at substantially reduced pressures and temperatures than would be possible without the use of such compounds. In most of the instances of such use, the carbon material which has been plasticized by the phosphorus-containing organic compound has been in the raw or uncalcined state. Sometimes no additional pitch binder is necessary or used since the volatile components of the uncalcined carbon form the necessary coking binder for the finished article. One of the great disadvantages of using uncalcined carbon lies in the fact that there is a great amount of shrinkage of the article upon baking. Tests have shown that by calcining carbon material to be formed into articles, the shrinkage in the article which occurs during baking has been reduced up to as much as 10 times, thus allowing the forming and baking of large dimension articles without the danger of excessive shrinkage destroying the article made. Usually calcining is done at temperatures around 1000° C. or higher depending upon the carbon source and the baking temperature of the article. It is highly advantageous, especially when large dimension articles are desired, to calcine the carbon material before forming and baking in order to reduce the volatiles content of the carbon and therefor reduce shrinkage.

It is therefore the object of this invention to provide a novel method and mix composition for producing a carbon article which is substantially resistant to oxidizing atmospheres which are present in most furnaces and which will have reduced volume shrinkage upon baking.

Fulfilling this object, the invention comprises a method for producing an oxidation resistant carbon article from a mix composition composed substantially of calcined carbon and containing as an essential ingredient therein at least one phosphorus-containing, oxidation-inhibiting, pitch-miscible, organic compound in an effective amount up to 10% in the aggregate by weight of the entire mix. It is the phosphorus-containing compound which imparts the oxidation resistance to the article in question. More specifically, aliphatic, aromatic and alkyl-aryl phosphates have been found to be the most effective materials to be used as mix additives in providing carbon articles with longer durability and greater ability to withstand the action of oxidizing conditions.

Among the compounds which have given practical results in the practice of this invention are tri-cresyl phosphate, tri-ethyl phosphate, methyl acid phosphate, bis (2-ethylhexyl) 2-ethylhexyl phosphonate, cresyl diphenyl phosphate, tri-iso-octyl phosphite, di-2-ethylhexyl phosphite, tri-butyl phosphate, tri-phenyl phosphate and octyl di-phenyl phosphate.

It has been found that calcined carbon, that is carbon which has substantially no volatile content, works best in the practice of this invention if it has an ash content of at least 0.25%. It has further been found that the final baking temperature of the formed carbon articles need not exceed 1200° C. in order to impart the protection desired in the baked article. More particularly, calcined coal base articles made with organic phosphate additives have been baked to between 800° and 1000° C. and calcined petroleum coke base articles have been baked to approximately 750° C. in order to impart the desired protection.

Various articles have been made according to this invention and tested for their resistance to oxidation by the following procedure: The weighed samples were put in aluminum dishes, which were placed on a ¾ inch thick copper plate placed in an oven at 450° C. to 600° C. Before each weighing, the samples were rolled to remove material which might have loosened because of the oxidation of the carbon bond. Oxidation tests were also carried out above 600° C. by placing the samples directly upon the copper plate.

The following may be cited as specific examples of mix formulations which have been experimentally formed to provide carbon articles which are resistant to oxidation.

A dry mix of 165 pounds of petroleum coke particles and 135 pounds of 55% petroleum coke flour each calcined to 1350° C. was made. To this basic dry mix, 78.6 pounds of coal tar pitch and 4.8 pounds of lubricating oil were added and the resultant mass extruded at conventional pressure and temperature, and baked to 750° C. to form 4 inch diameter by 15 inch articles.

The same proportions of basic dry mix, petroleum coke flour and particles calcined at the same temperature were blended with 70 pounds of coal tar pitch, 4 pounds of lubricating oil and 10.5 pounds of tri-cresyl phosphate and the resultant mix molded and baked as above. The results of tests conducted on these articles appear in Table I below. The proportions of additives are shown in parentheses based upon weight percent of the entire mix.

Table I

| Coke Stock | Percent Weight Loss at 465° C. In Air | | Percent Vol. Shrinkage of formed articles on Initial Baking to 750° C. |
|---|---|---|---|
| | 24 Hrs. | 48 Hrs. | |
| Control | 71.8 | 95.8 | 0.22 |
| TCP (2.7) | 16.3 | 17.6 | 1.52 |

A coal base article having no oxidation inhibiting additive was made by dry blending 200 pounds of coal and 133 pounds of 45% foundry coke flour each calcined to 2000° C. and mixing this blend with 95 pounds of coal tar pitch and 10 pounds of lubricating oil. This "wet mix" was molded at conventional pressure and temperature, and baked to 950° C. to form 4 inch diameter by 15 inch articles.

A dry mix of 215 pounds of coal and 143 pounds of 45% foundry coke flour each calcined at 2000° C. was blended with 90 pounds of coal tar pitch and 4.5 pounds of tri-cresyl phosphate, molded and baked as above noted to give 4 inch diameter by 15 inch articles containing 1% tri-cresyl phosphate by weight of the entire mix.

A dry mix of 215 pounds of coal and 143 pounds of 45% foundry coke flour each calcined to 2000° C. was blended with 81 pounds of coal tar pitch and 15 pounds of tri-cresyl phosphate to give a mix containing 3.4% tri-cresyl phosphate. The mix was molded and baked as above described into 4 inch diameter by 15 inch articles. All the articles made in accord with the above three examples were tested as to their ability to withstand oxidation at elevated temperatures and the results of these tests appear in Table II below.

Table II

| Coal Stock | Percent Weight Loss at 485° C. In Air | | Percent Weight Loss at 700° C. In Air | | Percent Vol. Shrinkage of formed articles on initial baking to 950° C. |
|---|---|---|---|---|---|
| | 5.5 Hrs. | 17 Hrs. | 4.0 Hrs. | 8.0 Hrs. | |
| Control | 2.87 | 72.9 | 20.2 | 32.3 | 0.34 |
| TCP (3.4) | 1.40 | 13.5 | 17.7 | 26.9 | 1.47 |
| TCP (1.0) | 2.35 | 16.3 | 18.8 | 30.7 | 1.51 |

Additives other than tri-cresyl phosphate have been added to calcined carbon base articles and tested for resistance to oxidation. The results of these tests appear in Table III below.

Table III

| Coal Stock | Percent Weight Loss at 600° C. in Air | | |
|---|---|---|---|
| | 2.0 Hrs. | 4.7 Hrs. | 6.7 Hrs. |
| Control | 16.2 | 42.5 | 59.3 |
| Methyl acid phosphate (0.532) | 6.09 | 12.6 | 15.7 |
| Tri-ethyl phosphate (0.532) | 11.7 | 33.8 | 50.0 |
| TCP (0.532) | 15.2 | 38.0 | 53.3 |

As shown by the above tables, the percent weight loss rate in air of carbon articles has been substantially reduced by the inclusion of minor amounts of organic phosphates as described above. It is also to be noted that there has been a slight increase in volume shrinkage by the addition of minor amounts of organic phosphates. Also observed, but not indicated in the tables was an increase in the apparent density of coal base articles with the organic phosphate additive.

Articles as large as 12 inches in diameter have been made using the practice of this invention and have withstood furnace operation under oxidizing conditions significantly better than similar articles with no oxidation inhibitor added thereto have in the past.

It may be convenient, without departing from the spirit and scope of this invention, to add a lubricating oil such as summer oil, prior to molding in order to increase the plasticity of the mix. It is not essential to the practice of this invention and may or may not be included.

This application is a continuation-in-part of Serial No. 574,085, filed March 27, 1956, now abandoned.

What is claimed is:

1. A mix adapted to be baked into an oxidation resistant carbon article which comprises calcined comminuted carbon, a pitch binder therefore in an amount of up to 20% by weight of said mix and at least one compound selected from the group consisting of tri-cresyl phosphate, tri-ethyl phosphate, methyl acid phosphate, bis (2, ethylhexyl)2-ethylhexyl phosphonate, cresyl dipenyl phosphate, tri-iso-octyl phosphite, di-2-ethylhexyl phosphite, tri-butyl phosphate, tri-phenyl phosphate and octyl di-phenyl phosphate, said compound being present in said mix in an effective amount up to 10% in the aggregate by weight thereof, said compound being an essential constituent therein and imparting said oxidation resistance to said article.

2. A mix adapted to be baked into an oxidation resistant carbon article which comprises calcined comminuted carbon having at least 0.25% ash content, a pitch binder therefor in an amount of up to 20% by weight of said mix and at least one compound selected from the group consisting of tri-cresyl phosphate, tri-ethyl phosphate, methyl acid phosphate, bis (2-ethylhexyl) 2-ethylhexyl phosphonate, cresyl diphenyl phosphate, tri-iso-octyl phosphite, di-2-ethylhexyl phosphite, tri-butyl phosphate, tri-phenyl phosphate and octyl di-phenyl phosphate, said compound being present in said mix in an effective amount up to 10% in the aggregate by weight thereof, said compound being an essential constituent therein and imparting said oxidation resistance to said article.

3. The method of making an oxidation resistant carbon article which comprises mixing calcined comminuted carbon, a pitch binder therefor in an amount of up to 20% by weight of said mix, and an effective amount up to 10% by weight of said mix of at least one compound selected from the group consisting of tri-cresyl phosphate, tri-ethyl phosphate, methyl acid phosphate, bis (2-ethylhexyl) 2-ethylhexyl phosphonate, cresyl diphenyl phosphate, tri-iso-octyl phosphite, di-2-ethylhexyl phosphite, tri-butyl phosphate, tri-phenyl phosphate and octyl di-phenyl phosphate, forming said mix into a desired shape and baking said molded shape to a carbonizing temperature.

4. The method of making an oxidation resistant carbon article which comprises mixing calcined comminuted carbon having an ash content of at least 0.25%, a pitch binder therefor in an amount of up to 20% by weight of said mix, and an effective amount up to 10% by weight of said mix of at least one compound selected from the group consisting of tri-cresyl phosphate, tri-ethyl phosphate, methyl acid phosphate, bis (2-ethylhexyl) 2-ethylhexyl phosphonate, cresyl diphenyl phosphate, tri-iso-octyl phosphite, di-2-ethylhexyl phosphite, tri-butyl phosphate, tri-phenyl phosphate and octyl di-phenyl phosphate, forming said mix into a desired shape and baking said molded shape to a carbonizing temperature.

5. The method of making an oxidation resistant carbon article which comprises mixing calcined comminuted carbon having an ash content of at least 0.25%, a pitch binder therefor in an amount of up to 20% by weight of said mix, and an effective amount up to 10% by weight of said mix of at least one compound selected from the group consisting of tri-cresyl phosphate, tri-ethyl phosphate, methyl acid phosphate, bis (2-ethylhexyl) 2-ethylhexyl phosphonate, cresyl diphenyl phosphate, tri-iso-octyl phosphite, di-2-ethylhexyl phosphite, tri-butyl phosphate, tri-phenyl phosphate and octyl diphenyl phosphate, forming said mix into a desired shape and baking said molded shape to a carbonizing temperature up to 1200° C.

References Cited in the file of this patent

UNITED STATES PATENTS

| | | |
|---|---|---|
| 2,404,208 | Bangham et al. | July 16, 1946 |
| 2,653,878 | Sejersted et al. | Sept. 29, 1953 |
| 2,685,539 | Woodburn et al. | Aug. 3, 1954 |

FOREIGN PATENTS

| | | |
|---|---|---|
| 648,539 | Great Britain | Jan. 10, 1951 |

UNITED STATES PATENT OFFICE
CERTIFICATE OF CORRECTION

Patent No. 2,989,408                      June 20, 1961

Charles S. Lowe et al.

It is hereby certified that error appears in the above numbered patent requiring correction and that the said Letters Patent should read as corrected below.

Column 1, line 25, for "interior" read -- exterior --.

Signed and sealed this 6th day of March 1962.

(SEAL)
Attest:

ERNEST W. SWIDER                      DAVID L. LADD
Attesting Officer                      Commissioner of Patents